Oct. 1, 1957     W. C. BENSON     2,808,288
VEHICLE TRANSPORTATION AND STORAGE CAPSULE
Filed Jan. 25, 1954     3 Sheets-Sheet 3
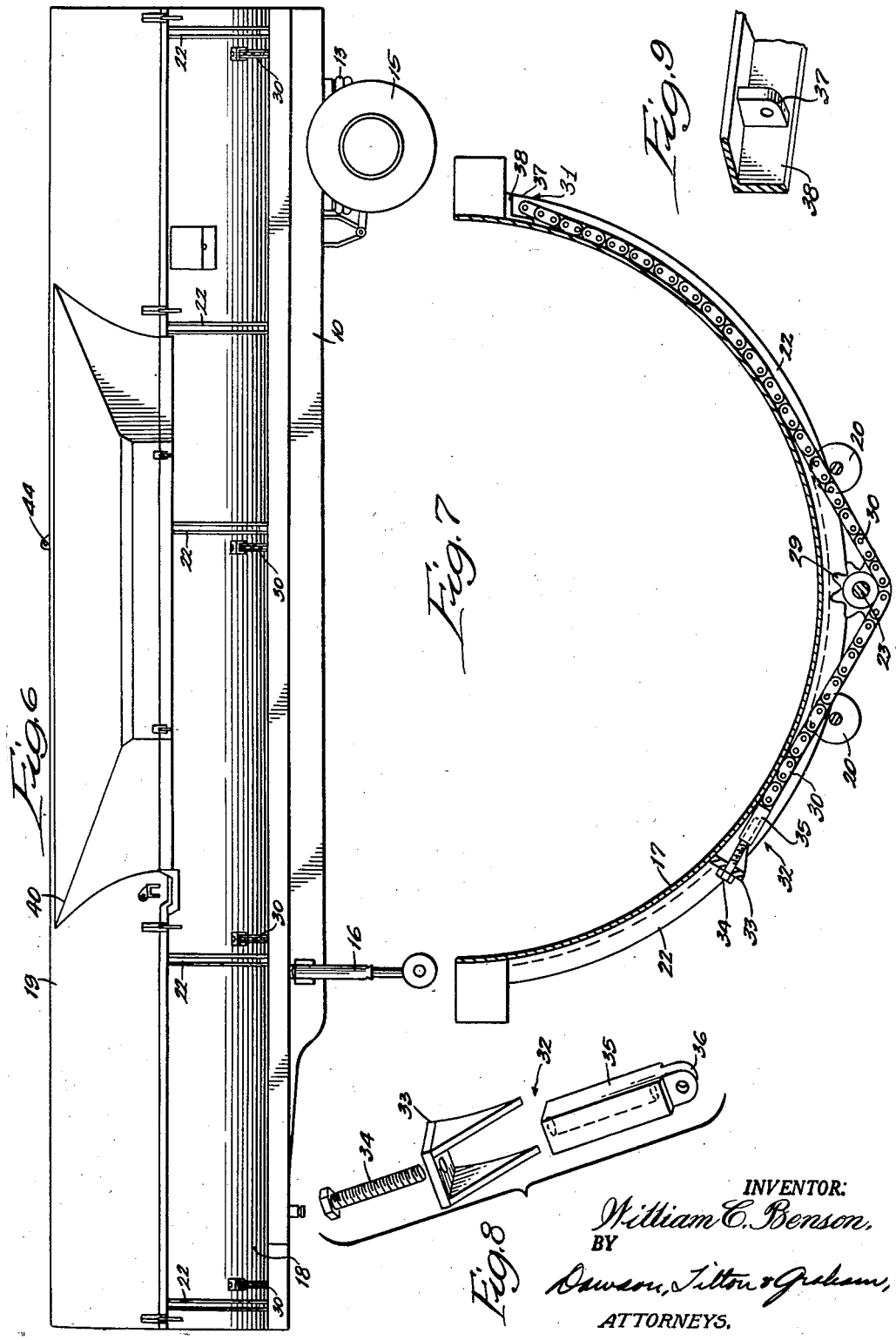
INVENTOR:
William C. Benson,
BY
Dawson, Tilton & Graham,
ATTORNEYS.

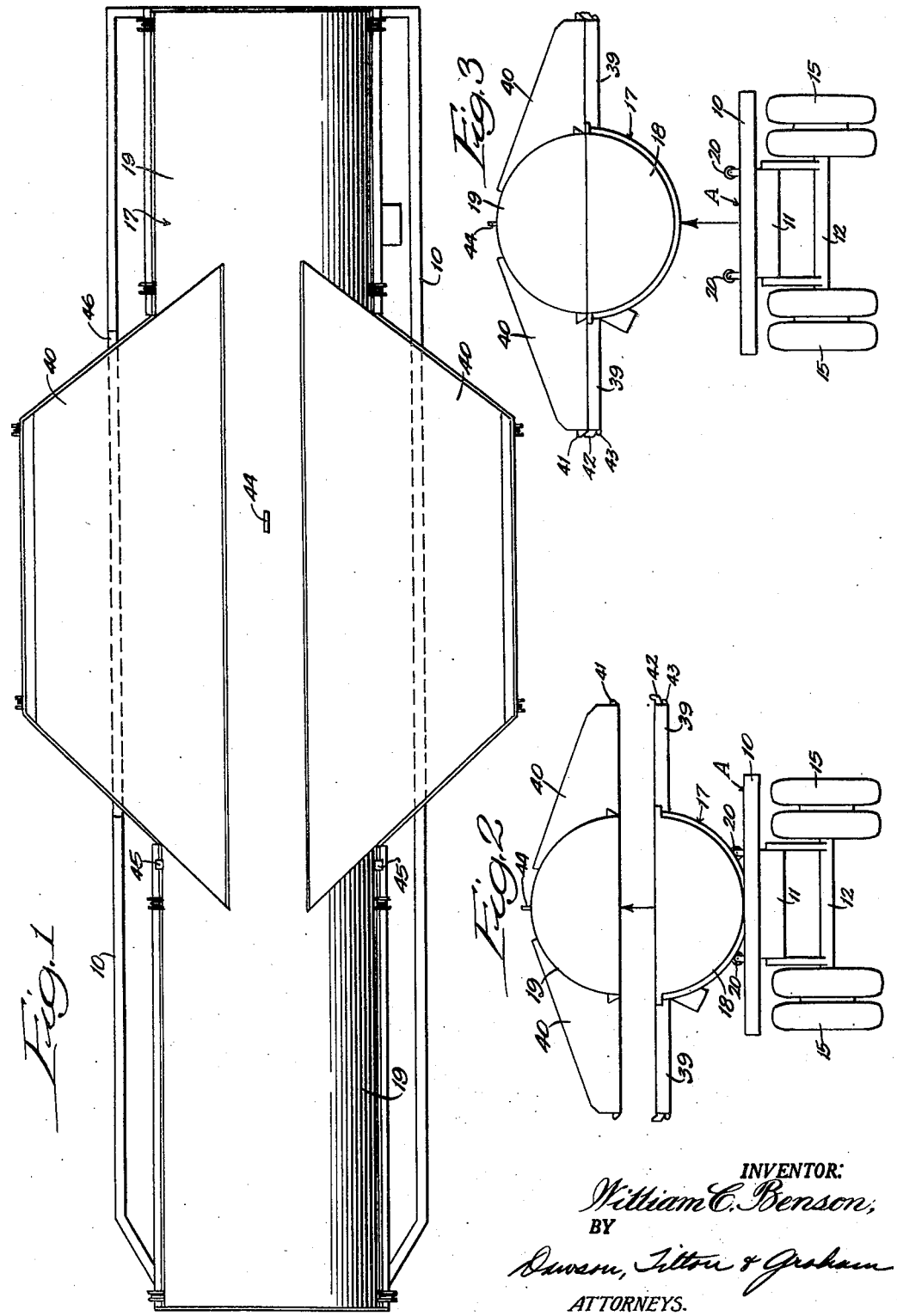

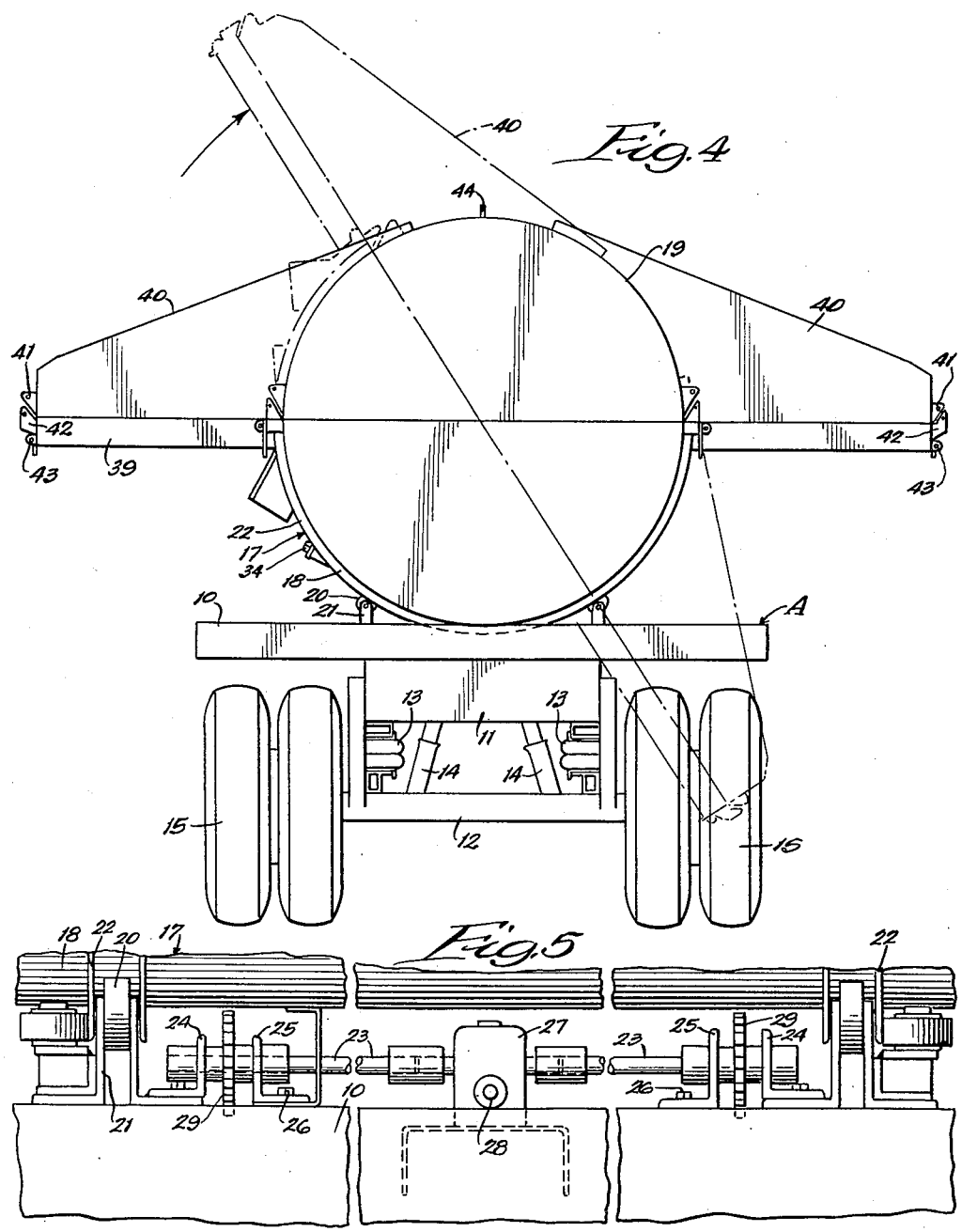

United States Patent Office 2,808,288
Patented Oct. 1, 1957

2,808,288

VEHICLE TRANSPORTATION AND STORAGE CAPSULE

William C. Benson, Augusta, Kans., assignor to Spencer-Safford Loadcraft, Inc., Augusta, Kans., a corporation of Kansas Application January 25, 1954, Serial No. 405,792

12 Claims. (Cl. 296—35)

This invention relates to a transportation and storage capsule and, more particularly, to a body shell for large trailers that is capable of carrying loads having unusual physical configurations and which may receive loads having a width greater than that of the trailer while supporting the load within substantially the dimensional limits of the trailer. Preferably, the shell is removable from the vehicle so that the load may be stored within the shell.

It is well known that the usual roadways throughout the country provide traffic lanes that are relatively uniform as to width and in order that traffic may move unobstructed and in safety, the maximum width of vehicles and the loads carried thereby must be limited to some predetermined maximum that can be readily accommodated by the roadways and the traffic lanes thereof. To insure this result, it is common for the various states, by statute, to prescribe maximum limits for vehicles traveling upon their roads.

There are occasions where it would be desirable to carry loads upon road vehicles that have a width in excess of the legal maximums or, in the absence of such statutory limitations, that have a width in excess of that which can be accommodated in safety by the roadways. For example, loads of such character include aircraft of various sorts having relatively large wing areas and which could not be turned upon their side and carried in that manner. Guided missiles provide a specific example of such aircraft or airborne projectiles and the apparatus disclosed herein has been successfully tested in the transportation of such craft.

It is accordingly an object of this invention to provide a capsule for receiving relatively wide objects therein for both transportation and storage. Another object is to provide a capsule that can be removably carried by a road vehicle such as a trailer. Still another object is to provide a means for supporting articles of relatively great width which may, for example, exceed the maximum width that can be safely or legally carried upon a road vehicle such as the trailer of a tractor-trailer rig in a manner such that the maximum limits of width are not exceeded. Yet another object of the invention is in providing a method and apparatus for transporting articles having portions of relatively large width upon a trailer having a width substantially less than said portions in a manner such that the large portions are substantially within the limits of the trailer width.

A further object of the invention is to provide a shell or body portion for a trailer that is rotatably mounted upon the trailer bed and which is adapted to receive articles having at least portions thereof of greater width than that of the trailer bed; the trailer bed being arranged to accommodate the enlarged portions upon rotation of the shell to orient the enlarged portions angularly relative to the bed. Still a further object is to provide in such apparatus means for releasably securing the shell upon the trailer bed. Yet a further object is to provide a shell or capsule as described above wherein shell half portions are provided and which can be separated to permit the insertion of an object thereinto and thereafter brought together in closing relation to substantially enclose the article received therein. Further objects and advantages of the invention will appear as the specification proceeds.

An embodiment of the invention is illustrated in the accompanying drawings, in which—

Fig. 1 is a top plan view of a capsule embodying my invention; Fig. 2 is a diagrammatic end view in elevation of a trailer equipped with the capsule and wherein the upper portion of the capsule is shown removed from the lower portion thereof; Fig. 3 is a similar diagrammatic end view in elevation showing the capsule removed from the trailer bed; Fig. 4 is an end view in elevation of a trailer equipped with the shell or capsule of the invention and wherein the broken lines illustrate the rotated position thereof; Fig. 5 is a broken longitudinal view of the driving means for rotating the capsule relative to the trailer bed; Fig. 6 is a side view in elevation of a trailer having a capsule mounted thereon; Fig. 7 is a transverse sectional view showing a drive chain and sprocket for rotating the capsule; Fig. 8 is a perspective view of the clamp members shown in spaced-apart relation; and Fig. 9 is a broken perspective view of a securing member.

Referring now in particular to Figs. 4 and 6, it is seen that therein is illustrated a trailer which is designated generally with the letter A and which comprises an elongated bed or platform 10 supported upon a chassis 11 which in turn is secured and supported by the axle 12 through the spring assembly 13 and shock absorbers 14. The axle 12 may be equipped at each side with the dual wheel assemblies 15. As is shown best in Fig. 6, the trailer may be provided with a support wheel structure 16 which is normally raised above the level of the ground when the trailer is connected to a suitable truck-tractor and which may be lowered into the position illustrated for supporting the forward end of the trailer when the truck-tractor is removed therefrom. Trailers of this general construction are well known in the art and it is believed, therefore, unnecessary to further describe the trailer structure in detail. It wil be appreciated that while a trailer has been illustrated and described, the invention is applicable for use with other road vehicles which may have a tractor formed integrally therewith, etc.

Supported upon the bed 10 of the trailer A for rotary movement is a shell or capsule or trailer body portion 17 which is preferably formed in two halves by a lower shell portion 18 and an upper shell portion 19. The shell is mounted for rotary movement upon the bed 10 about the longitudinal axis of the shell. Such support may be provided by a plurality of spaced-apart rollers 20, each of which is mounted between the bracket member 21. As is seen in Fig. 4, the rollers are provided in pairs and are in alignment on opposite sides of the trailer bed 10. Similarly, by referring to Fig. 6, it is seen that a plurality of roller members are provided along the longitudinal axis of the trailer and shell. The rollers or wheels 20 are rotatably mounted and are received within the arcuate channels 22 with which the lower shell portion 18 is equipped. An arcuate channel is provided for each pair of the rollers as they are spaced longitudinally along the trailer. Any number of support members may be provided, and the precise number will depend to some extent upon the size and weight of the capsule or shell 17 and the load carried thereby.

As has been heretofore stated, the capsule 17 is mounted for rotation relative to the bed 10 and preferably this is accomplished through a power drive arrangement that is illustrated in Fig. 5 and which, also as a part thereof, provides a means for anchoring the capsule securely to the bed 10 of the trailer. By referring to Fig. 5, it is seen that an elongated shaft 23 is provided and extends longitudinally along the bed 10 and preferably under the central portion of the capsule 17. The shaft 23 is supported for free rotation within the bearing members 24 which are in turn supported within L-shaped brackets 25 that may be secured to the trailer by means of the cap screws 26. As is illustrated, a plurality of brackets and bearings may be provided for adequately supporting the shaft 23. Intermediate the ends of the shaft a worm gear mechanism is illustrated generally by the box-like construction and is designated with the numeral 27. The gear assembly 27 may include a gear reducer and may have a take-off 28 which is adapted to be rotated and through the gear train to rotate the shaft 23. The takeoff 28 may be rotated manually by suitable crank assembly, but preferably is adapted to be coupled to a power unit for rotating the shell mechanically.

Interposed between the L-shaped brackets 25 which are preferably grouped in pairs, are the sprocket members 29 which are rigidly secured to the shaft 23 and are therefore rotated thereby. Each of the sprockets 29 has entrained thereabout a sprocket chain 30, as is seen best in Fig. 7. One end of each of the chains 30 is secured to the shell 17 as is shown at 31 in Fig. 7. At its other end, each chain 30 is releasably secured to the shell 17 by means of the coupling structure designated generally with the numeral 32. The coupling structure includes an ear 33 extending laterally from the shell 17 and which is provided with an opening therethrough to rotatably receive a shank of a cap screw 34 which is threadedly received within the elongated nut 35 which at one end is equipped with an ear 36 that is in turn connected to the end link of the chain 30. This structure is shown best in Fig. 8 wherein the bolt 34, ear 33 and nut 35 are shown in spaced-apart relation. At its other end, the sprocket chain 30 may be connected to the lug or ear 37 which is rigidly carried by the L-shaped channel 38 (shown best in Fig. 9) and which is secured to the lower shell 18 in the manner illustrated in Fig. 7.

It has been heretofore mentioned that the shell or capsule 17 is formed by a lower shell portion 18 and an upper shell portion 19 that form substantially shell halves and which are adapted to be separated in loading the shell and thereafter brought into mating engagement to enclose the load received within the shell. The shell 17 may be formed of any suitable material and is preferably of sheet metal construction. It will be appreciated that the strength of the shell 17 must be such as to maintain itself without collapse, etc. upon the rollers 20 and must be also of sufficient strength to adequately support the load received thereon. Intermediate the ends of the elongated shell 17 the lower shell portion 18 is equipped with a pair of laterally-extending projections 39 which, as is seen best in Figs. 2, 3, and 4, extend outwardly for a considerable distance beyond the longitudinal edges of the trailer bed 10. Similarly, the upper shell portion 19 is equipped with a pair of outwardly-extending projections 40 that are alignable with the projections 39 and adapted to mate with the same so that when the shell halves are brought together a complete enclosure is provided, as is shown best in Figs. 3 and 4. The size of the projections 39 and 40 may be varied as required and will depend upon the configuration and size of the load or article to be received within the shell. For example, if a guided missile is to be received within the shell for transportation and storage, the length and diameter of the shell must be such that it will easily receive the missile and the projections or extensions 39 and 40 must be of adequate size so that they will readily receive the wing structure of the missile.

Preferably, means are provided for locking the shell portions together when a load is received therein. It will be apparent that numerous means may be provided for securing such interlock, but I prefer to employ the structures shown best in Fig. 4 which are exceedingly simple and comprise an outwardly-extending ear 41 carried by the upper shell 19 and a complementary ear or projection 42 carried by the lower shell portion 18. Each of the ears 41 and 42 is equipped with an aperture therethrough that may receive safety wire which is then twisted together to firmly secure the shell halves together. If desired, a further ear 43 is secured to the lower shell portion 18 and the wire may be threaded through an aperture provided in that ear for providing a further safety connection. It will be apparent from Fig. 1 that a plurality of the connectors or fasteners are provided and again, any number deemed desirable may be employed.

As shown in Fig. 1 and also in Fig. 6, the upper shell is equipped with spaced-apart eye members 44 and 45 which are intended to receive the hook portions of suitable lifting chains so that the upper shell 19 may be lifted from the lower shell for placing a load within the lower shell portion, as is illustrated in Fig. 2. It is also apparent from Fig. 1 and Fig. 4 that the bed 10 of the trailer is provided with a cut-away portion 46 through which one of the extension groupings 39 and 40 may be moved. If desired, such a cut-away portion may be provided on each side of the trailer bed.

*Operation*

In operation of the structure, the shell 17 is placed upon the bed 10 of a trailer so that the channel members 22 receive the rollers 20 therein. Thereafter, the sprocket chains 30 are secured to the lower shell 17 in a manner hereinbefore described. During this preceding operation the upper shell portion 19 may either be secured to the lower shell 18 or may be removed therefrom. In any event, it is preferable at this time to orient the lower shell portion 18 so that the projections 39 thereof lie in substantially a horizontal plane. The load to be carried within the shell is then placed therein and thereafter the upper shell portion 19 is lowered into position wherein it mates along the peripheral edges thereof with the lower shell portion 18. Next, the clamp members 41 and 42 are secured together to lock the shell portions in position.

It will be clear from an inspection of Figs. 1 and 4 that at such time the extensions 39 and 40 project outwardly beyond the transverse limits defined by the longitudinal edges of the trailer bed 10. This outward extension beyond such edges will generally exceed the maximum legal widths that can be carried upon the roadways. To avoid this result, the takeoff 28 is rotated either manually or mechanically to bring about a rotation of the shaft 23 and sprockets 29. This rotary movement of the sprockets 29 through the chains 30 will cause the shell to rotate and the projections 39 and 40 thereof will eventually be brought into the position illustrated by the broken lines in Fig. 4. In such position one pair of extensions is angled downwardly and is received within the recess or cut-out portion 46 of the trailer bed, while the other projection 39 and 40 is angled upwardly and outwardly. It is clear, however, from Fig. 4, that these projections now fall within the limits of the trailer width and the width of the load carried by the trailer is then within the maximum legal limits and maximum limits of safety.

After the load has been transported to the desired location, it may be desired to store the load within the capsule and this may be accomplished by releasing the chains 30 and thereafter lifting the entire capsule and its contents from the trailer bed 10 in a manner shown in Fig. 3. If desired, the lower shell section or half-shell 17 may be provided with means for supporting the shell structure for storage, such as legs or feet, etc.

While the invention has been described largely in terms of structure, it will be appreciated that a method of transporting articles having a width greater than the width of a trailer bed in a manner such that the load does not exceed the width of the trailer, has also been disclosed.

While in the foregoing specification an embodiment of the invention has been set out in considerable detail for purposes of illustration, it will be apparent to those skilled in the art that considerable deviation may be made in these details without departing from the spirit and principles of the invention.

I claim:

1. In storage and transportation apparatus, a vehicle providing an elongated bed having a recessed area along at least one longitudinal edge thereof, a shell for receiving articles therein, means for supporting said shell upon said bed for rotation relative thereto along the longitudinal axis of the bed, means for rotating said shell, said shell being equipped with at least one article receiving portion aligned with said recess and extending outwardly beyond the longitudinal edge of said bed on the side thereof having said recess and in spaced relation with the bed when said shell is supported with said portion in a generally horizontal plane, said shell providing a lower shell section and an upper shell section releasably secured to said lower shell section, and said shell being arranged so that said portion is received within said recess when said shell is rotated to bring said portion in its entirety substantially within an area defined by the longitudinal edges of said bed.

2. The structure according to claim 1 in which said shell is provided also with a similar outwardly-extending article receiving portion on the other side thereof.

3. The structure of claim 2 in which said shell is releasably supported upon said bed.

4. The structure of claim 3 in which said means for rotating said shell comprises power means.

5. In a vehicle transport structure, a vehicle adapted to carry loads having widths substantially greater than the maximum width of the vehicle, an article carrying member extending longitudinally of said vehicle and for the most part having a width no greater than that of the vehicle, said member having at least one outwardly projecting article receiving portion with dimensions such that it normally extends outwardly beyond a side of said vehicle, means for supporting said member upon said vehicle for rotational movement about an axis extending along the longitudinal axis thereof, and means operative to rotate said member to a position in which said projecting portion is inclined relative to a generally horizontal plane through said vehicle and to the extent that substantially all of the member and its projecting portion lie within the maximum width of the vehicle.

6. The structure of claim 5 in which said means for supporting said member comprises a bed having a recessed area along one side thereof adapted to receive said projecting portion therein, and in which rotation of said member moves said projecting portion into said recessed area.

7. The structure of claim 6 in which said member has also a similar outwardly projecting article receiving portion, said portions being spaced from each other by substantially 180°.

8. In a structure of the character described, a road vehicle providing an elongated support bed, a shell supported upon said bed for rotation relative thereto about the longitudinal axis of the shell, said shell having a projecting portion extending outwardly beyond a side of said bed when said projecting portion lies in a plane generally parallel to that of said bed, said bed being provided with a recess in the longitudinal edge thereof corresponding with said projecting portion and in alignment therewith for receiving the same therein, and means for rotating said shell to bring the projecting portion thereof into said recess with the end thereof positioned below said bed, whereby said shell is substantially confined within an area defined by the longitudinal edges of said bed.

9. The structure of claim 8 in which said shell is releasably supported on said bed.

10. The structure of claim 8 in which said shell is a two-piece unit and comprises a lower shell which is supported upon said bed and an upper shell portion releasably secured to the lower shell.

11. In combination with a vehicle having a bed provided with a recessed area along a longitudinal edge thereof, a load member dimensioned so as to be confined substantially between the longitudinal edges of said bed but having a projecting portion aligned with said recess and extending beyond that recessed edge of the bed when oriented in a plane substantially parallel thereto, means for supporting said load member on said bed for rotation along the longitudinal axis thereof, and means for rotating said load member so as to swing the projecting portion thereof into said recess whereby said load member in its entirety is substantially confined between the longitudinal edges of said bed.

12. The combination of claim 11 in which said load member has a similar projecting portion substantially diametrically opposite the first mentioned projecting portion.

References Cited in the file of this patent

UNITED STATES PATENTS

| | | |
|---|---|---|
| 770,775 | Norris | Sept. 27, 1904 |
| 1,235,128 | Frank | July 31, 1917 |
| 1,534,187 | Pugh | Apr. 21, 1925 |
| 1,584,338 | Welcker | May 11, 1926 |
| 1,734,785 | Williams | Nov. 5, 1929 |
| 2,468,651 | Blume | Apr. 26, 1949 |
| 2,530,613 | Hopper | Nov. 21, 1950 |

FOREIGN PATENTS

| | | |
|---|---|---|
| 559,697 | France | June 21, 1923 |
| 808,338 | Germany | July 12, 1951 |
| 535,363 | Great Britain | Apr. 7, 1941 |